United States Patent [19]

Bronder et al.

[11] Patent Number: 5,005,169
[45] Date of Patent: Apr. 2, 1991

[54] FREQUENCY DIVISION MULTIPLEX GUARDBAND COMMUNICATION SYSTEM FOR SENDING INFORMATION OVER THE GUARDBANDS

[75] Inventors: Joseph B. Bronder, East Berlin, Pa.; William H. Gossard, Grasonville, Md.

[73] Assignee: Westinghouse Electric Corp., Pittsburgh, Pa.

[21] Appl. No.: 437,153

[22] Filed: Nov. 16, 1989

[51] Int. Cl.$^5$ ............................ H04J 1/14; H04J 1/20
[52] U.S. Cl. ......................................... 370/76; 375/1; 370/18
[58] Field of Search .................. 370/76, 122, 69.1, 18, 370/19; 375/1, 58

[56] References Cited

U.S. PATENT DOCUMENTS

| | | | |
|---|---|---|---|
| 3,885,217 | 5/1975 | Cintron | 375/58 |
| 3,969,585 | 7/1976 | Boulanger | 370/76 |
| 4,425,642 | 1/1984 | Moses et al. | 370/76 |
| 4,425,661 | 1/1984 | Moses et al. | 370/76 |
| 4,703,474 | 10/1987 | Foschini et al. | 370/18 |
| 4,763,103 | 8/1988 | Galula et al. | 375/1 |

Primary Examiner—Douglas W. Olms
Assistant Examiner—Min Jung
Attorney, Agent, or Firm—W. G. Sutcliff

[57] ABSTRACT

A frequency division multiplex guardband communication system is provided which increases the communication capability of conventional FDM systems with negligible effect on overall system performance. The additional capacity is achieved through the use of guardbands which lie between the information bands of the FDM. To avoid interfering with recovery of the FDM information, the amount of new signal energy added to the individual guardbands is well below the guardband noise level.

4 Claims, 4 Drawing Sheets

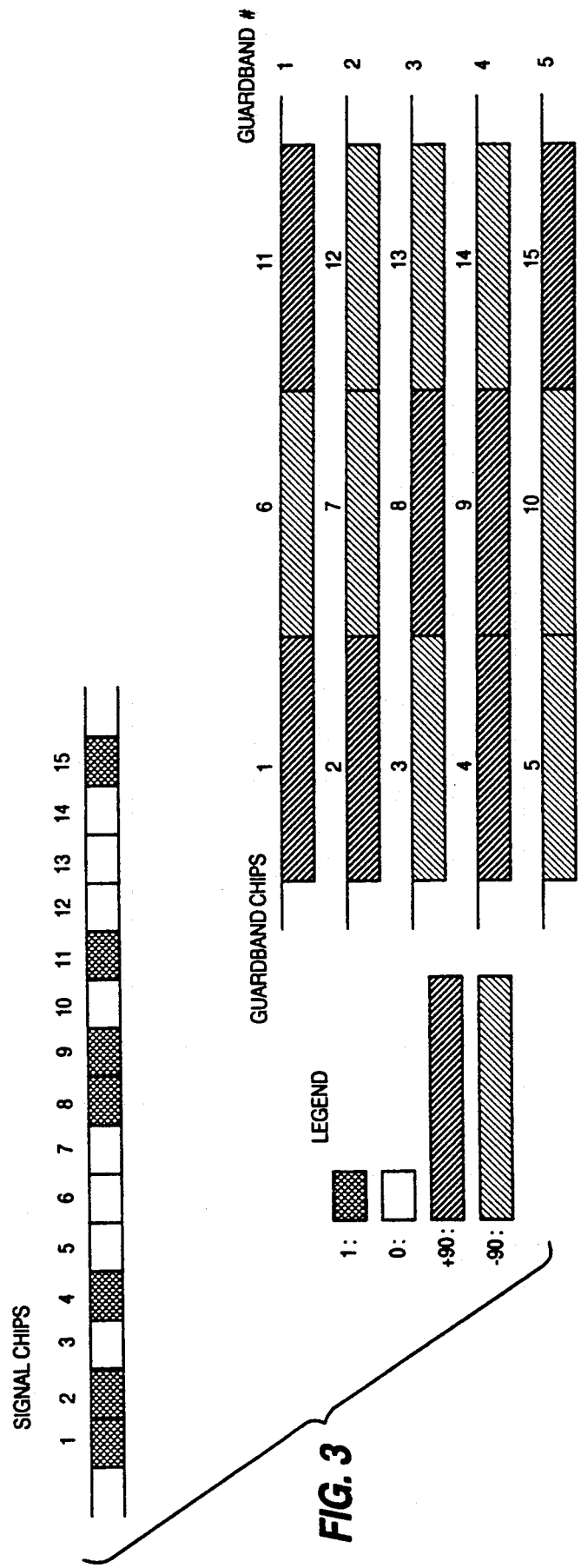

FREQUENCY DIVISION MULTIPLEX GUARDBAND COMMUNICATION SYSTEM FOR SENDING INFORMATION OVER THE GUARDBANDS

BACKGROUND OF THE INVENTION

(1) Field of the Invention

The present invention is directed to a frequency division multiplex (FDM) guardband communication system for increasing the communication capability of the system and having a negligible effect on the overall system performance. In particular, the frequency division multiplex guardband communication system of the present invention uses the guardbands which lie between the information bands to send additional information. The energy of the new signal added to the individual guardbands is well below the guardband noise level so that interference with the recovery of the main FDM information does not occur. Recovery of the new signal energy can be facilitated through the use of spectrum type coding on the transmit side and matched filtering on the receive side

(2) Description of the Related Art

Frequency division multiplex (FDM) systems for combining voice grade channels for transmission over a common medium employ guardbands between channels to reduce crosstalk and facilitate demultiplexing. These guardbands represent unutilized bandwidths in an FDM system.

In conventional FDM systems, the basic FDM unit is a "group" consisting of twelve voice grade channels. Each channel is assigned a 4 kHz frequency slot and positioned in frequency so that one of its two redundant sidebands is centered in the assigned slot. The channels are then filtered to remove unwanted sidebands and summed to form the basic group. Higher order frequency division multiplexers are used to combine, for example, five groups into a 60 channel "supergroup", five "supergroups" into a 300 channel "mastergroup", etc.

Within the FDM group, each channel consists of an information band and a two region guardband. The first guardband extends from DC to approximately 250 Hz. The second guardband extends from 3400 to approximately 4000 Hz. Voice (or data) occupies the 250 to 3400 Hz band between the two guard regions. After multiplexing, the upper end of the guardband for one channel combines with the lower end of the guardband for the next higher channel in the multiplex output to form a combined guardband region of 850 Hz between channels. The total unutilized bandwidth therefore, for a 12 channel group, is approximately 9400 Hz (11 bands × 850 Hz). For a supergroup, the amount of an unutilized bandwidth is approximately 47 kHz, and for a mastergroup is approximately 235 kHz.

SUMMARY OF THE INVENTION

It is an object of the present invention to provide means for using guardband spectrum for an additional channel of information, while preserving the integrity of the FDM system.

It is another object of the present invention to provide a frequency division multiplex guardband communication system in which the amount of new signal energy added to the individual guardbands is well below the guardband noise level.

Yet another object of the present invention is to provide a frequency division multiplex guardband communication system in which recovery of the signal in the guardband is facilitated through the use of spread spectrum type coding on the transmit side and matched filtering on the receive side.

Still another object of the present invention is to incorporate means for adding spread spectrum type modulation to the guardbands in a manner which avoids interference with the recovery of the basic FDM transmission.

The above mentioned objects of the present invention are achieved by providing a frequency division multiplex system employing guardbands for transmitting additional signals including generator means for generating a pseudo-random noise bit sequence, hereinafter referred to as p-n chips, converting means for converting the signal to digital form, if necessary, combining means for combining a predetermined number of pn chips with a number of data bits, hereinafter referred to as signal chips, switching means for assigning signal chips to individual guardbands, mixing means for positioning each signal chip in a center of its assigned guardband, pulse shaping means for suppressing the side lobes of the guardband centered signal chips, first adding means for adding the guardband centered signal chips, hereinafter referred to as the guardband signals, and second adding means for combining the guardband signal with the FDM signal and outputting the result to a communications medium. Recovery means is provided for recovering the guardband signal and includes multiplying means for translating each guardband to DC, filtering means for isolating individual signal chips, phase shifting means for aligning the outputs of the filter means, summing means for summing the outputs from the phase shifting means, and detector means for recovering the data.

In particular, the present invention uses a frequency division multiplex system which combines voice grade channels for transmission over a common medium employing guardbands between channels, including first oscillator means and first tone generating means for generating tones in the center of each guardband. The oscillating means places each tone generated by the tone generating means, when modulated by the signal chips, below the noise level of the guardband in which it is inserted. Transmit pseudo-random noise sequence generator means is provided for generating a sequence of pseudo-random bits (pn chips) at N times the data bits, the value of N being greater than or equal to 1. Exclusive OR means is provided for adding the pn chips from the transmit pseudo-random noise sequence generator means to the data bits in modulo 2. Means for receiving the resultant signal chips and the tones and means for phase modulating the tones with the resultant chips are provided, along with pulse shaper means for suppressing the side lobes of the phase modulated tones. Third adding means is provided for adding the modulated tones to the FDM signal.

The present invention also provides means for receiving an FDM signal which has been modified by the insertion of phase modulated tones in the guard bands of the FDM signal. Oscillator means on the receiving side is provided along with receiving tone generator means, and means for multiplying the tones with the guard bands which correspond to the transmitted tones modulated by the transmitted pn chips summed with the transmitted data bits. Synchronizing means is provided for synchronizing the integration and dump means, filtering means and integrating means with the transmit pn sequence generator means. In addition, means are provided for summing the integrated output of all guardbands used as described above for obtaining the data bits which were transmitted. Digital-to-analog conversion means are provided, if necessary, for obtaining the transmitted signal information.

BRIEF DESCRIPTION OF THE DRAWINGS

FIG. 3 is a diagram of the distribution of the signal chips into the guardbands.

DESCRIPTION OF THE PREFERRED EMBODIMENT

The present invention is directed to a frequency division multiplex guardband communication system in which a signal is processed so that it can be added to and recovered from the guardband without interfering with the recovery (by demultiplexing) of the primary voice grade channels in the frequency division multiplex system.

Figure 1:
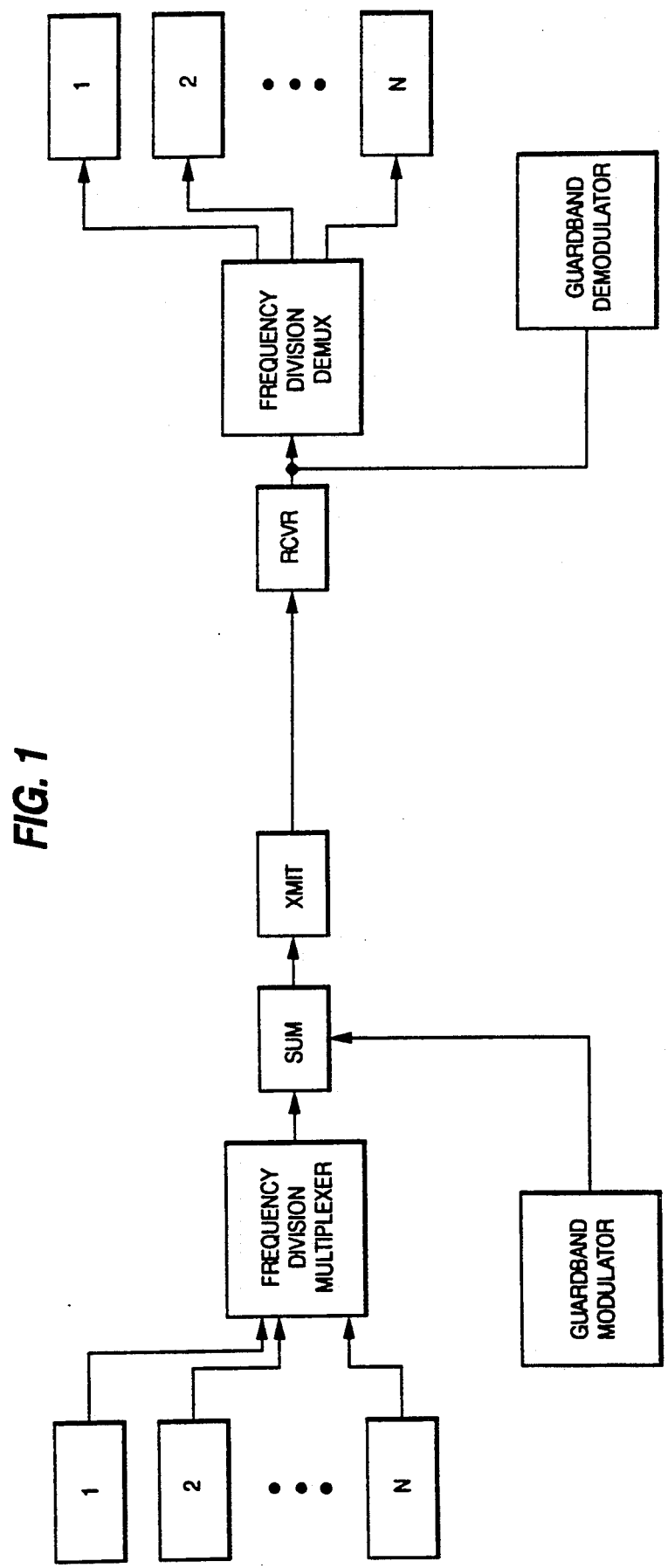
FIG. 1 is a block diagram of a frequency division multiplexer FDM system according to the present invention including a guardband modulator and guardband demodulator.

FIG. 1 is a conventional FDM system which includes the guardband modulator and guardband demodulator of the present invention.

Figure 2A:
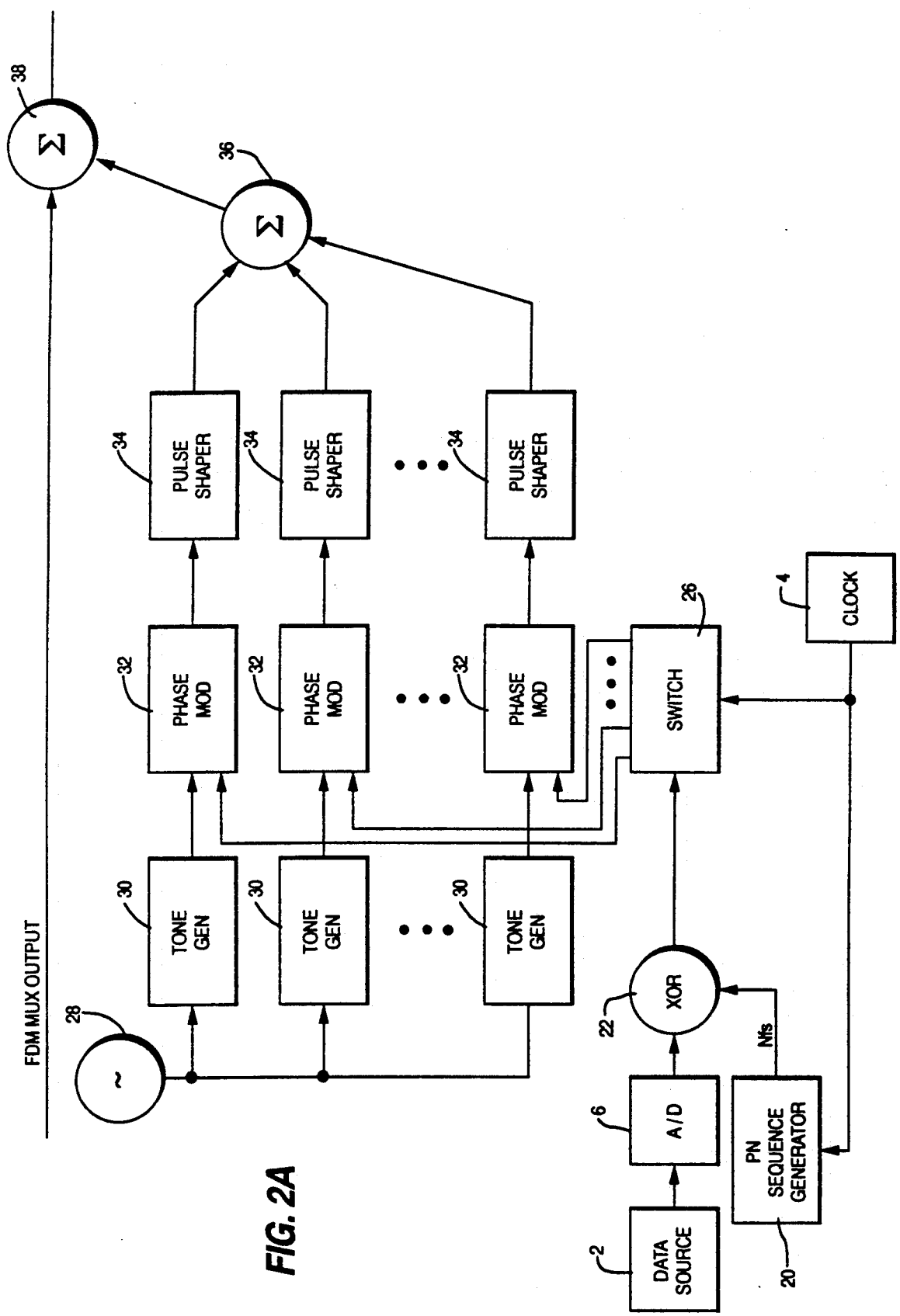
FIG. 2 (including FIGS. 2A and 2B) is a block diagram of the guardband modulator and guardband demodulator in FIG. 1.
Figure 2B:
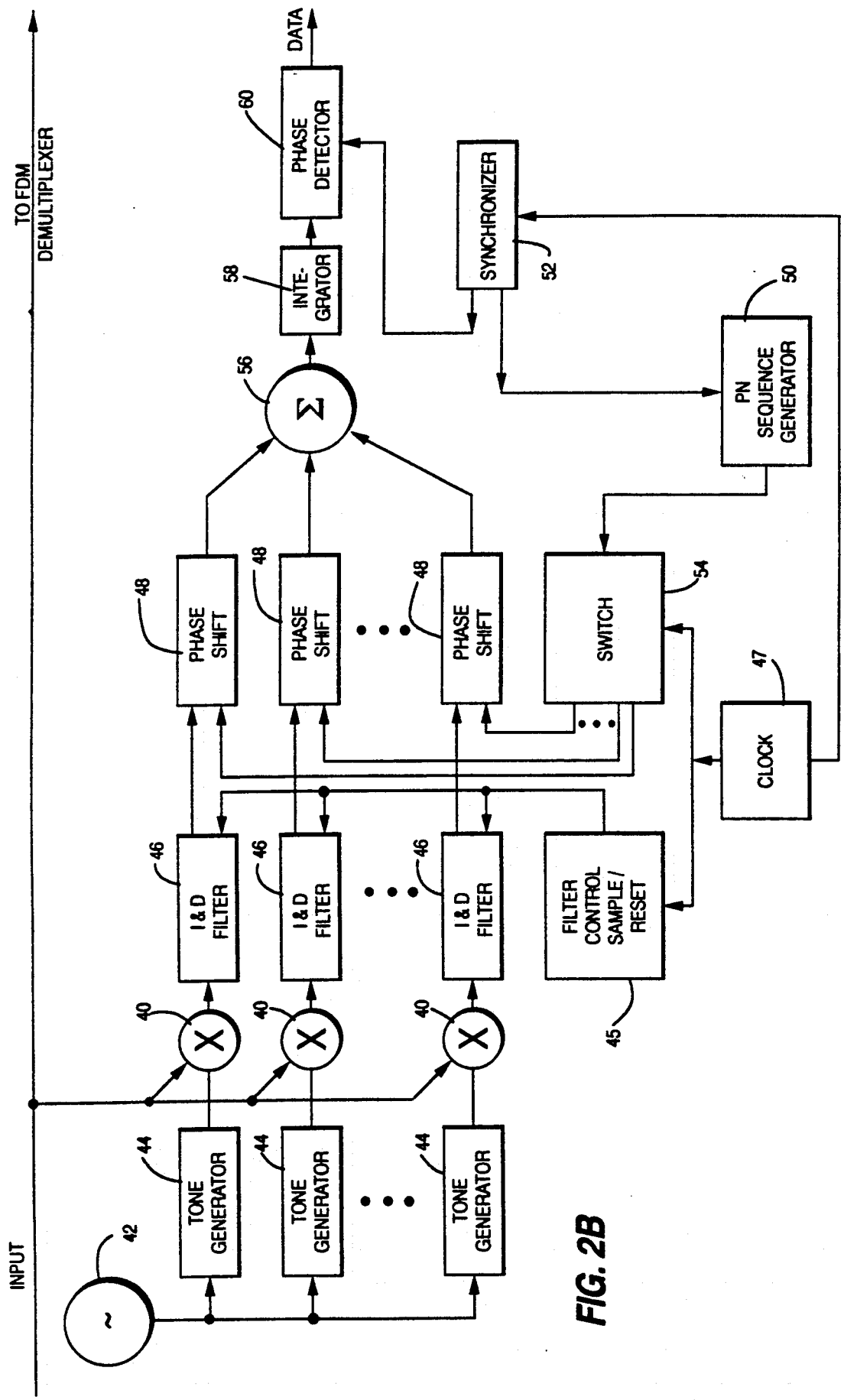

A block diagram of the circuitry for the guardband modulator and guardband demodulator for performing the above-mentioned addition and recovery from the guardband is shown in FIGS. 2A and 2B.

In FIG. 2A, a set of constant frequency waveforms (tones) tuned to the centers of each guardband and modulated by the signal added to the guardband are added to the frequency division multiplex system. These waveforms are derived from a common source so as to maintain coherence. The amplitudes of the waveforms are set well below the level of noise in the guardband so that their presence has a negligible effect on the demultiplexing of the voice grade channels. The amplitude of the waveform is at least 10 db below the guardband noise level.

Modulation of the information sent over the guardbands is derived by combining an information signal from a data source 2 to be added to the frequency division multiplex system with a pseudo-random noise bit stream (pn chips) controlled by a clock 4. The pseudo-random noise bit stream (pn chips) is generated by a transmit pseudo-random noise sequence generator 20. The data, which is converted from analog-to-digital by a digital-to-analog converter 6, if necessary, is then input into an exclusive OR circuit 22 along with the pn chips from the transmit pseudo-random noise sequence generator 20. The chip rate out of the transmit pseudo-random noise sequence generator 20 is N times the information bit rate. The integer N is chosen to be a multiple of the number of guardbands used and is determined so that system processing gain when combined with the guardband tone-to-noise ratio translates into an information bit rate that is suitable for the additional channel-information.

For a 12 channel (11 useful guardbands) FDM system, for example, a chip rate of 77 times the information bit rate provides a system processing gain of 19 dB. When the guardband tone-to-noise ratio is minus 10 dB, the signal-to-noise ratio after processing is 9 dB. The corresponding bit error probability is 1 error per 4,000 data bits (Stein and Jones, *Modern Communication Principles,* McGraw Hill, 1967, pp. 304–305). The output from the exclusive OR circuit 22 is input to a switch 26 which distributes the chips such that the same number of chips are input to each of the guardbands.

FIG. 3 is one example of how the switch 26 would distribute 15 chips per data bit from the exclusive OR circuit 22 to the guardbands of an FDM system having 5 guardbands.

An oscillator 28 is provided for generating a signal which is then input into a number of tone generators 30. The tone generators 30 generate tones that are centered on the guardbands. The tones from the tone generator 30 and the output chips from the switch 26 are then input to phase modulators 32. The phase modulators 32 shift the tones by a plus or minus 90 degrees depending on the state of the signal chips. The switch 26 outputs chips at a rate of Nfs where fs is the data bit rate. Each phase modulator 32 receives chips at the rate of Nfs/M, M being the number of guardbands employed. The phase modulators 32 maintain a constant phase for a period of M/Nfs seconds, hereinafter referred to as the guardband chip period.

The outputs from the phase modulators 32 are then input to respective pulse shapers 34. Each pulse shaper 34 suppresses the side lobes of the signal output from a respective phase modulator 32 so that the side lobes do not interfere or extend into the conventional energy bands. A first summation circuit 36 is provided which sums the outputs from each of the pulse shapers 34 and then inputs this summation into a second summation circuit 38 which is connected to the frequency division multiplex output line. This summed signal is then transmitted through the communication medium. On the receive end, the output of the communication channel is then input to the multiplication means 40 to recover the information between the basic voice channels. In addition, on the recovery end, a second oscillator 42 is provided which has the same frequency as the first oscillator 28. Tone generators 44 are connected between the second oscillator 42 and the multiplication means 40.

The signals from the FDM line (in one configuration as shown in FIG. 2B) are each down converted to a common baseband then input from the multiplication means 40 into integrate-and-dump filters 46. The integrate-and-dump filters 46 integrate over the guardband chip period controlled by a filter control circuit 45 which provides a filter reset rate of Nfs/M. The filters 46 recover the chips which were assigned at the transmitter side to the individual guardbands by the switch 26. The filter control circuit 45 is controlled by a clock 47. Then, the integrate-and-dump filters 46 input these chips into phase shifters 48 which shift the phase of the guardband chips by the opposite amount that they were initially shifted on the transmit end. That is, if there was a plus 90 degree phase shift initially, then there is a minus 90 degree phase shift at this point. If, however, there was a minus 90 degree phase shift, then the phase shifters 48 supply a plus 90 degree phase shift. The result is a net phase shift of 0 degrees, so that each of the outputs has the same phase. This procedure removes the effects of the pn chips without altering the phase shifts produced by the data bits.

The phase shifters 48 are driven by a receive pseudo-random noise sequence generator 50 which is synchronized through a synchronizer 52 to the transmit pseudo-random noise sequence generator 50. The pseudo-random noise sequence generators and synchronizers are conventional devices.

The receive pseudo-random noise sequence generator 50 is connected to the phase shifters 48 through a second switch 54. The second switch is also controlled by the clock 47. The phase shifters 48 output chips into a third summation circuit 56. The third summation circuit 56 sums the signal chips from each guardband and provides a processing gain equal to the number M of guardbands employed. The third summation circuit is connected to an integrator 58 which averages over all the chips in one data bit (N/M chips from each guardband). The processing gain for the integrator is N/M. Therefore, the combined processing gain from the summer 56 and the integrator 58 is N (where N=M*N/M). A phase detector 60 is connected between the integrator 58 and the synchronizer 52 to obtain the original data bit value input at the receive end of the system.

All of the above mentioned devices used in the system are conventional devices.

In communication systems in which guardbands are supplied with pilot tones, a monitor system can be employed to detect which guardbands have the pilot tones and, therefore, avoid those guardbands. This would, however, require additional circuitry and would slow the data bit rate.

In the present invention, not only can the guardbands be employed, but if other modulation schemes are employed, for example, any vacant channel that is not being used for a speech or data channel can be employed since on the average, only approximately 35% to 40% of the channels are actually being used at any one time. Likewise, any communication system which uses frequency division multiplexing, such as cable television systems, etc., can take advantage of the basic concept of employing unused spectrum to send information. Further, the more spectrum employed, the more data can be sent. At mastergroup spectrum levels speech could even be sent rather than data because of the large amount of available spectrum.

Another modification of the present invention includes sending keyed tones above the noise rather than under the noise level.

The present invention provides a technique that extends the utility of current frequency division multiplex practice by providing means for additional (non-interfering) communication channels. Further, the technique can be applied to privacy communications by inserting multiplexed spread spectrum segments only between active normal channels. This would reduce the average data rate and would require varying the data rate input of the data channel.

The foregoing is considered as illustrative only of the principles of the present invention. Further, since numerous modifications and changes will readily occur to those skilled in the art, it is not desired to limit the invention to the exact construction and application shown and described, and accordingly, all suitable modifications and equivalents may be resorted to, falling within the scope of the invention and the appended claims and their equivalents.

What is claimed is:

1. A frequency division multiplex (FDM) guardband communication system for using guardbands for sending additional signals between the information bands of the frequency division multiplex system, comprising:

generator means for generating pn chips;

data means for providing data to the system;

converting means, operatively connected to said data means, for converting the signal to digital form, if required;

combining means, operatively connected to said converting means and said generator means, for combining a predetermined number of pn chips with a number of data bits and obtaining signal chips;

switching means, operatively connected to said combining means, for assigning the signal chips to individual guardbands;

modulation means, operatively connected to said combining means, for combining digital data to be added to the frequency division multiplex system with the pn chips;

means, operatively connected to said modulation means, for summing the pn modulated digital signals to a FDM output for transmission through a communication medium;

shifting means for translating each guardband to DC;

filter means, operatively connected to said shifting means, for isolating individual chips and outputting a signal;

sampling means, operatively connected to said filter means, for sampling and phase alignment of the output signals from said filter means;

summing means, operatively connected to said sampling means, for summing outputs from said sampling means; and detector means, operatively connected to said summing means, for recovering the signal added to the frequency division multiplex system.

2. A frequency division multiplex (FDM) system transmitting FDM signals for combining voice grade channels for transmission over a common medium employing guardbands between channels, said system comprising:

first oscillator means;

first tone generating means, operatively connected to said first oscillator means, for generating tones in a center of each guardband, said first oscillator means placing each tone generated by said first tone generating means below noise level of the system;

transmit pseudo-random noise sequence generator means for generating a sequence of Pn bits at N times the Pn rate, N being greater than or equal to 1, the sequence of data bits forming chips;

switching means, operatively connected to said transmit pseudo-random noise sequence generating means, for receiving and distributing the chips in the guardbands;

phase modulation means, operatively connected to said tone generating means and said switching means, for receiving and modulating the chips and the tones and outputting signals;

pulse shaper means, operatively connected to said phase modulation means, for receiving the output signals from said phase modulation means and suppressing side lobes of the output signals;

first summing means, operatively connected to said pulse shaper means, for summing the outputs from said pulse shaper means and outputting a summed signal;

second summing means, connected to said first summing means, for summing the summed signal from said first summing means with the FDM signal;
second oscillator means;
second tone generating means connected to said second oscillator means;
receiving means, operatively connected to said second summing means and said second tone generating means, for receiving the summed output and for mixing the guardband chips to DC;
filtering means, operatively connected to said receiving means, for integrating over the period of the guardband chips to recover the guardband chips;
synchronizing means;
receive pseudo-random noise sequence generator means, operatively connected to said synchronizing means, synchronized to said transmit pseudo-random noise sequence generator means by said synchronizing means;
second switching means, operatively connected to said receive pseudo-random noise sequence generator means;
phase shifting means, operatively connected to said filtering means and said second switching means, for receiving and shifting the phase of the guardband chips and outputting phase shifted chips;
third summing means, operatively connected to said phase shifting means, for summing all the chips;
integration means, operatively connected to said third summing means, for averaging over all the chips in one data bit; and
phase detecting means, operatively connected to said integration means and said synchronizing means, for receiving the chips and receiving the data and recovering the data in the guardbands.

3. A frequency division multiplex system according to claim 2, wherein said filtering means comprise integrate-and-dump filters and a filter control circuit.

4. A frequency division multiplex (FDM) guard band communication system for using guardbands to send signals between the information bands of the frequency division multiplex system, comprising:
transmitting means for transmitting signals between guardbands of the FDM system comprising:
transmit side oscillator means for producing a set of coherent tones, each one of the tones centered on one of the guardbands of an FDM signal;
first tone generating means, operatively connected to said transmit side oscillator means, for outputting tones;
first clock means for generating synchronizing signals;
pseudo-random noise (pn) sequence generator means, operatively connected to said first clock, for producing a series of quasi-random ones and zero bits (pn chips) which are synchronized with said oscillator means;
information signal generating means for generating data bits;
analog-to-digital converter means, operatively connected to said information signal generating means for converting data bits from said information signal generating means when the signal is analog;
exclusive OR means, operatively connected to said pn sequence generator means and said A/D converter, for adding a predetermined number N, N being an integer, of pn chips with the data bits in modulo 2 for obtaining a pseudo-random set of signal chips;
switching means, operatively connected to said exclusive OR means and said phase modulation means, for routing and distributing the signal chips from said exclusive OR means;
phase modulation means, operatively connected to said first tone generating means and said switching means, for modulating outputs of the tone generating means and the signal chips by a plus or minus 90 degree phase dependent on the state of the signal chips resulting in a spread spectrum modulation and outputting spread spectrum chips;
shaping means, operatively connected to said phase modulation means, for shaping and filtering the spread spectrum chips to limit the bandwidth of the spectrum to the guardband width;
first summing means, operatively connected to said shaping means, for summing the band limited spread spectrum chips from each guardband to produce spread spectrum guardband spectra; and
second summing means for summing the spread spectrum guardband spectra with the FDM signal; and
receiving means for receiving the FDM signals from said transmit means and decoding the information sent between the guardbands, comprising:
receive side oscillator means having a phase coherent with the transmit side oscillator means;
second tone generator means, operatively connected to said receive side oscillator means, for producing a set of tones identical to those on the transmit side;
filtering means, operatively connected to said transmitting means and said second tone generator means, for filtering the guardbands of the FDM signal;
phase shift means operatively connected to said filtering means;
second clock means;
synchronizing means for providing synchronizing signals;
second pn sequence generator means, operatively connected to said synchronizing means, for synchronizing said receive side oscillator means with said synchronizer means and with the transmit side signal chips;
second switching means, operatively connected to said second pn sequence generator means, for routing and distributing pn chips to said phase shifting means, for phase shifting the tones in synchronism with the transmit side signal chips;
third summing means, operatively connected to said phase shift means, for adding the outputs from said phase shift means;
integrating means, operatively connected to said third summing means, for integrating the resultant energy over a data bit and outputting an integrated signal; and
phase detector means, operatively connected to said integrating means and said synchronizing means, for receiving the integrated signal and detecting and outputting the results.

* * * * *